July 23, 1940.    K. L. TATE    2,209,179
THERMOMETER
Filed Oct. 22, 1938
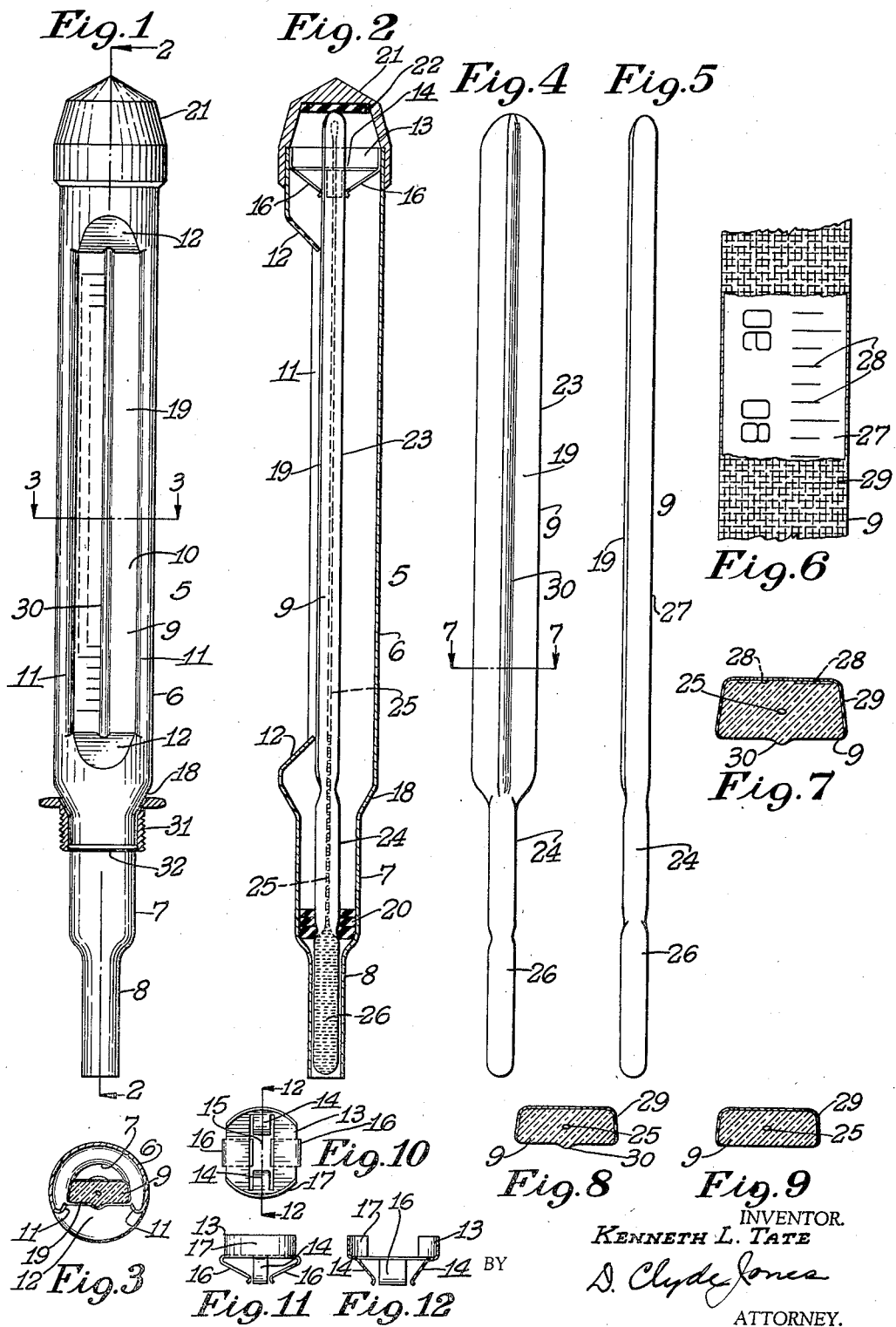
INVENTOR.
KENNETH L. TATE
BY D. Clyde Jones
ATTORNEY.

Patented July 23, 1940

2,209,179

UNITED STATES PATENT OFFICE 2,209,179

THERMOMETER

Kenneth L. Tate, Rochester, N. Y., assignor to Taylor Instrument Companies, Rochester, N. Y., a corporation of New York Application October 22, 1938, Serial No. 236,469

2 Claims. (Cl. 73—374)

This invention relates to thermometers, and particularly to industrial thermometers.

Prior thermometers of this type generally included an elongated case provided with a window opening therein and terminating in a reduced portion affording a chamber for the thermometer bulb. The indicating portion of the thermometer tube was supported within the casing behind the window opening with suitable graduated scale plates mounted in the casing adjacent the thermometer tube, while a glass plate closed the window opening to exclude dirt and the like from the interior of the casing. Such thermometers were relatively expensive because of their large number of parts and because it was necessary to make them with great care to prevent the thermometer tubes from becoming misadjusted with respect to graduated scale plates, which misadjustment would result in inaccuracy of the temperature indication.

The present invention has for its purpose the simplification of the construction of thermometers of this type and the elimination of the possibility of the thermometer tube from moving with respect to the scale plates. It is therefore proposed in accordance with the main feature of the invention to provide a ribbon-like thermometer tube having the graduations engraved directly thereon and to support the thermometer tube within the casing behind the window opening to close the same, thereby eliminating the necessity for separate scale plates and a separate glass window closure.

Another feature of the invention relates to the provision of a new and improved thermometer tube comprising a flat ribbon-like tube section having graduations on one flat surface thereof and a light shield on the rear flat surface thereof, said tube being integrally connected by a section of marine tube to the mercury bulb.

A further feature of the invention relates to the provision of a thermometer tube of substantially rectangular cross-section having a broad flat rear surface to enable graduations and related numerals engraved thereon to be of such size that they are readily legible through the tube.

These and other features of the invention will appear from the detailed description and claims when taken with the drawing, in which Fig. 1 is a front elevation of a thermometer incorporating the features of the present invention; Fig. 2 is a vertical section taken on the line 2—2 of Fig. 1; Fig. 3 is a horizontal section taken on the line 3—3 of Fig. 1; Figs. 4 and 5 are front and side elevations, respectively, of a thermometer tube forming a part of the present invention; Fig. 6 is a rear view of a fragment of the tube shown in Fig. 4, with a portion of the backing omitted to show the underlying graduations; Fig. 7 is a transverse section taken on the line 7—7 of Fig. 4, enlarged to show the graduations engraved on the rear surface of the thermometer tube and the light shield covering the same; Figs. 8 and 9 are transverse sections similar to Fig. 7 illustrating the contour of two of the preferred forms of the thermometer tube, in which the graduations may be engraved on either of the broad front or rear surface; Figs. 10 and 11 are top and side views respectively of a gripping element forming a part of the present invention; and Fig. 12 is a section of the gripping element taken on the line 12—12 of Fig. 10.

The thermometer generally designated 5 comprises a tubular metal casing 6 open at one end and having portions of reduced diameter 7 and 8 comprising a bulb chamber at its other end. A thermometer tube 9, supported within the casing 6, is adapted to be viewed through a window opening 10 formed in the casing 6. The margins of the opening 10 are preferably bent inwardly to provide flanges 11 and 12, which may or may not engage the front surface of the thermometer tube 9, thereby substantially closing the window opening. This construction obviates the need of a separate glass plate closure for the opening. A disk-like, flanged member 13 is secured, as by spot welding, within the casing 6 adjacent the upper open end thereof. This member is provided with spring fingers 14 struck out therefrom to afford an elongated slot 15 which is slightly larger than the cross section of the indicating portion of the thermometer tube. Other spring fingers 16 are formed by slitting the flange portion 17 of the member 13 and bending the metal between adjacent slits downwardly into the position shown in Figs. 2 and 11. The spring fingers 14 and 16 resiliently grip the upper end of the tube 9 and thereby hold it securely in place within the casing with the lower end disposed in the conical portion 18 and with the front surface of the tube substantially in contact with the inturned flanges 11 and 12. A plurality of composition washers 20 maintain the lower end of the tube 9 in proper position in the chamber.

The upper end of the casing 6 may be closed by means of a removable cap 21 having inwardly projecting diametrically opposed pins (not shown) which engage bayonet slots (not shown), provided in the upper end of the casing 6. This cap may be provided with a sponge rubber cushion 22 to prevent the tube 9 from coming into direct contact with the cap.

The thermometer tube 9 comprises a long flattened glass ribbon-like indicating portion 23, substantially rectangular in cross section and a connecting marine tube section 24 of reduced diameter fused to or integrally joined to one end of the section 23. A bore 25 extends through the sections 23 and 24 and communicates with a bulb 26 joined to the free end of the tube section 24. The bulb contains mercury or other thermosensitive liquid. The glass ribbon portion 23 is preferably flat providing two broad surfaces 19 and 27 whereby the graduations 28 etched or otherwise applied preferably to the rear flat surface 27 will be clearly visible through the glass from the front. It will be understood that the graduations may, if desired, be applied to the front surface of the tube. A suitable light shield or backing 29 of enamel, glass, paint or the like covers the rear surface 27 to aid in reading the graduations. The broad, flat glass ribbon portion 23 enables graduations and related numerals to be of such size that they are readily legible through the tube and this together with the fact that the mercury or indicating column lies between the observer's eye and the graduations or scale facilitates accurate and easy reading of the height of this column. Furthermore, since the graduations are etched directly on the thermometer tube, the possibility of slippage between the tube and the graduated scale, such as may occur when these parts are not integral, is avoided.

While in the preferred construction shown in Figs. 1 to 8 inclusive, the thermometer tube has been provided with a lens 30, it will be understood that this lens may be omitted and a tube having a flat surface, as illustrated in Fig. 9, may be used instead.

An externally threaded nut 31, rotatably mounted on the reduced portion 7, by means of the ring 32 seated on this reduced portion, is adapted to mount the thermometer in the position where it is to be used.

I claim:

1. A thermometer comprising an elongated metal casing, said casing having an elongated window opening formed therein, the long margins of said casing defining said window projecting inwardly of said casing, an elongated flattened thermometer tube within said casing, said tube having a bore therein, one flat surface thereof being in substantial engagement with said margins to substantially close said opening, a graduated scale on a flattened surface of said thermometer tube, a bulb portion joined to said tube communicating with the bore thereof, and a thermosensitive liquid in said bulb.

2. A thermometer comprising a tubular casing generally circular in cross section and having an elongated window opening therein extending lengthwise thereof, the marginal edges of said window comprising inwardly extending flanges, an elongated glass tube generally rectangular in cross section and having a bore extending lengthwise therethrough, said tube extending within said casing in generally symmetrical relation to a diameter of said casing, a flat surface of said tube having a width and a length at least equal to the dimensions of said window opening to substantially contact the margins of said window to close the same, a graduated scale on said tube visible through said opening, a bulb portion joined to said tube communicating with the bore thereof, and a thermosensitive liquid in said bulb.

KENNETH L. TATE.